(12) United States Patent
Nikitin et al.

(10) Patent No.: US 8,474,052 B2
(45) Date of Patent: Jun. 25, 2013

(54) USER-ADMINISTERED LICENSE STATE VERIFICATION

(75) Inventors: Egor Nikitin, Bellevue, WA (US); Ramprabhu Rathnam, Snoqualmie, WA (US); Ning Zhang, Bothell, WA (US); Van Lanning, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 12/634,683

(22) Filed: Dec. 9, 2009

(65) Prior Publication Data

US 2011/0138472 A1    Jun. 9, 2011

(51) Int. Cl.
*H04L 29/06* (2006.01)
*H04L 9/00* (2006.01)
*H04L 9/08* (2006.01)
*H04L 9/32* (2006.01)

(52) U.S. Cl.
USPC ............. 726/26; 713/176; 380/277; 380/279; 380/282

(58) Field of Classification Search
None
See application file for complete search history.

(56) References Cited

U.S. PATENT DOCUMENTS

| | | | |
|---|---|---|---|
| 6,996,543 B1* | 2/2006 | Coppersmith et al. | 705/50 |
| 7,424,457 B2 | 9/2008 | Khaishgi et al. | |
| 7,571,856 B2 | 8/2009 | Lo | |
| 7,765,600 B2* | 7/2010 | Saunders et al. | 726/27 |
| 8,037,294 B2* | 10/2011 | Nochta | 713/150 |
| 2002/0088855 A1* | 7/2002 | Hodes | 235/385 |
| 2004/0128395 A1* | 7/2004 | Miyazaki | 709/229 |
| 2005/0149759 A1 | 7/2005 | Vishwanath et al. | |
| 2006/0005249 A1* | 1/2006 | Wu et al. | 726/26 |
| 2006/0165260 A1 | 7/2006 | Vanjani et al. | |
| 2007/0014016 A1 | 1/2007 | Benedikt et al. | |
| 2007/0174196 A1* | 7/2007 | Becker et al. | 705/50 |
| 2007/0288323 A1 | 12/2007 | Halevy | |
| 2008/0270306 A1 | 10/2008 | Blencowe | |
| 2009/0028338 A1 | 1/2009 | Martin | |

OTHER PUBLICATIONS

"Windows Genuine Advantage Notifications", Retrieved at <<http://www.microsoft.com/genuine/AboutNotifications.aspx?displaylang=en>>, Aug. 20, 2009, pp. 2.

"Microsoft's Software Protection Platform: Protecting Software and Customers from Counterfeiters", Retrieved at <<http://www.microsoft.com/presspass/features/2006/oct06/10-04SoftwareProtection.mspx>>, Microsoft PressPass, Oct. 4, 2006, pp. 3.

* cited by examiner

*Primary Examiner* — Shin-Hon Chen

(57) ABSTRACT

The product keys of software applications that can be utilized to identify, and activate to a higher functional state, legitimate copies of such software applications can be asymmetrically encrypted. Such encrypted product keys can be provided to potential purchasers without fear of theft of the original product keys. The encrypted product keys can be provided to an independent, trusted third-party validation authority that can decrypt such encrypted product keys and can, such as in conjunction with the software application manufacturer, verify the validity of the software applications associated with such product keys. For software applications bundled on a computing device, a tool can be executed by either the seller or potential purchaser to collect and display encrypted product keys for verification purposes. For software applications sold in an online environment, an escrow service can be utilized to keep, and provide when requested, product keys of software applications offered for sale.

20 Claims, 6 Drawing Sheets

USER-ADMINISTERED LICENSE STATE VERIFICATION

BACKGROUND

Unlike many other products, the computer-executable instructions that comprise a software application can be perfectly reproduced, resulting in a copy that is, for all intents and purposes, identical to the original. As a result, the authors and manufacturers of software applications have struggled against improperly licensed copies of their software applications, with each unlicensed copy potentially resulting in one less sale of that software application. Lack of control over the distribution of properly licensed, authentic software application products also means that malicious computer-executable instructions, traditionally known as "malware", including, for example, viruses and Trojans, can appear in the copies of software, affecting user privacy and security and negatively impacting the image of the original software manufacturer. Additionally, as networks of computing devices, including worldwide networks, become more ubiquitous, the copying of software applications continues to increase.

Much like with other products, software manufacturers have attempted to combat the unauthorized copying of software applications through mechanisms that make the original, properly purchased software application, better than the copy. For example, software manufacturers have offered post-sales service, such as continued upgrades and improvements, to those whose copies of software applications are properly licensed. With malware becoming increasingly dangerous, the post-sales upgrades and improvements offered to those with legitimate copies of software applications have become more important, as such upgrades and improvements are often directed to increasing the security of the software applications, and decreasing their vulnerability to malware.

Traditionally, a purchaser of a software application cannot know whether the software application being purchased is a legitimate copy until after the transaction has been completed, the purchaser has already paid, and has installed the software application on a computing device. At such a time, the software application can enable the purchaser to perform an activation process by which properly licensed copies with original, unmodified software bits can be identified and activated or validated, such as, for example, to receive post-sales service. However, to combat the proliferation of unlicensed copies of software applications, many software application activation processes can deactivate or reduce or eliminate the capabilities of software applications found to be improperly licensed during the activation process. A purchaser of a software application, therefore, currently has no mechanism available to them by which they can verify the validity and legitimacy of a copy of a software application until after the money is paid and without possibly harming, or, at the very least, changing, the software application in the process.

SUMMARY

The validity and legitimacy of a copy of a software application program product is often verified based on a unique identifier assigned to each valid copy of the software application. Such unique identifiers are traditionally called "product keys" or "serial numbers," and are typically provided in textual, human-readable form, either printed on documentation that is included with a boxed copy of the software application or provided in an electronic manner, such as via an electronic mail (email) message delivered in conjunction with, or otherwise associated with, a copy of the software application, including downloaded, or otherwise electronically delivered, copies of the software application. However, while product keys can be utilized to prove the validity of a particular copy of a software application, they can also, if freely provided, be stolen or willingly improperly distributed to activate as valid an otherwise unlicensed copy of a software application.

In one embodiment, therefore, the product key of a software application can be asymmetrically encrypted such that the product key cannot be derived from the encrypted version absent specialized information. Such an encrypted product key can then be freely provided to prove the validity of a particular copy of a software application without fear that the encrypted product key will be decrypted and used.

In another embodiment, a trusted and independent third-party authority can have the necessary information to derive a product key from the encrypted product key. Such a "validation authority" can then be provided the encrypted product key, such as by a seller or potential purchaser of a copy of a software application, and can derive therefrom the product key and, by using the product key, can determine the validity of the particular copy of the software application associated with such a product key. If necessary, the validation authority can provide the product key to the original manufacturer of the software application, or an entity delegated by such an original manufacturer, to verify the validity of the particular copy of the software application associated with that product key. The validation authority can then provide a response, to either the seller, or potential purchaser, or both, of a copy of a software application, indicating the validity of the software application. The response from the validation authority can be signed to prevent tampering.

In a further embodiment, sellers of software applications, who primarily utilize network communications and may not have a physical store for the customer to visit, can provide one or more product keys to a third-party escrow service that can asymmetrically encrypt one of the product keys, upon an indication from a potential purchaser that they wish to validate a corresponding software application being offered for sale, and provide such an encrypted product key to either the potential purchaser or the validation authority directly. Upon completion of the sale of a software application, the third-party escrow service can remove the corresponding product key from its database.

In a still further embodiment, sellers of computing devices that include bundled software applications can execute a tool to collect product keys of the bundled software applications and asymmetrically encrypt them or, alternatively, the tool can receive product keys that are already asymmetrically encrypted. The tool can then utilize the validation authority to verify the validity of the software applications associated with such product keys and can, optionally, cause a certification to be printed that the bundled software applications are valid, which the seller of the computing device can affix to the computing device to alleviate customer concerns. Alternatively, a potential purchaser of a computing device with bundled software applications can themselves execute the tool. In such a case, the tool can display one or more asymmetrically encrypted product keys to enable the potential purchaser to independently contact the validation authority and receive, from the validation authority, an indication of the validity of the bundled software applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
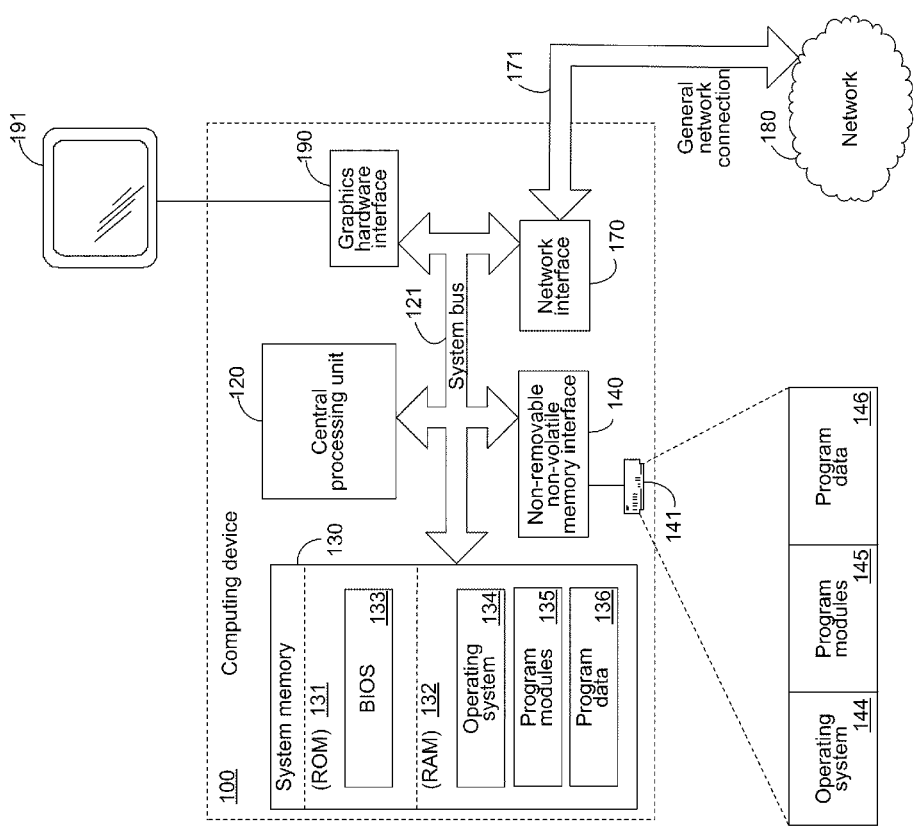
FIG. 1 is a block diagram illustrating an exemplary computing device.

The following description relates to the verification of the validity of software applications offered for sale without exposing the seller of such software applications to potential theft, or intentional or unintentional leakage of product keys associated with those software applications. One or more product keys can be asymmetrically encrypted such that they can be provided to potential purchasers of the software applications without concern that such potential purchasers can derive therefrom the product keys themselves and, thereby, steal them. A party seeking to verify the validity of a software application can provide the asymmetrically encrypted product key of such a software application to a validation authority that can have the capability to decrypt the product key and provide it to the software manufacturer, or the delegate thereof, and receive, in return, an indication of the validity of the software application associated with the product key. The validation authority can then provide the indication of validity, signed to prevent tampering, back to the potential purchaser of such a software application, either directly, or indirectly such as through a seller or escrow service. In addition, for software applications being sold in a bundled manner with a computing device, a tool can be utilized by either a potential purchaser, or the seller, to scan the computing device, obtain product keys and encrypt them, or obtain encrypted product keys directly and display such encrypted product keys. Optionally, such a tool could transmit the encrypted product keys to the validation authority and print, for the seller, a paper certification of the validity of the software products bundled with the computing device.

As utilized herein, the term "product key" means any one or more unique identifiers, however delivered, that are utilized to prove legal and proper possession and acquisition of one or more copies of a software application product. Thus, the term "product key", as utilized herein, is meant to include serial numbers, license codes, and other like identifiers. The term "encrypted product key", therefore, means any one or more collections of data that represent one or more product keys in an encrypted form. An encrypted product key can, as will be described in detail below, validate one or more software application products without directly, in the encrypted form, proving legal and proper possession and acquisition of those one or more software application products. The encrypted product key can, therefore, as will also be shown below, be freely provided without the fear of theft that would traditionally be associated with the unrestricted provision of unprotected product keys.

The techniques described herein focus on, but are not limited to, the utilization of asymmetrically encrypted product keys to verify the validity of copies of software applications. Indeed, the techniques below are equally applicable to any unique identifier of a software application, irrespective of whether or not such an identifier can be utilized for activation, or similar, purposes. Consequently, while the descriptions below will reference product keys of software applications, the descriptions are not so limited and are intended to encompass other types of identifiers.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can optionally include graphics hardware, including, but not limited to, a graphics hardware interface 190 and a display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For example, the computing device 100 is shown in FIG. 1 to be connected to a network 180 via a general network connection 171 that can be a local area network (LAN), a wide area network (WAN) or other network connection. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

As will be known by those skilled in the art, the computer-executable instructions of the operating system 144, other program modules 145, as well as the program data 146, are typically delineated into, and sold as, software application program products that are directed to aiding the user of the computing device 100 in performing one or more categories of tasks and activities. For example, the operating system 144 is traditionally sold as a single software application. Similarly, the program modules 145 and program data 146 can be comprised of software applications directed to, for example, office tasks, such as word processing, spreadsheet analysis, and e-mail, graphics-based tasks, such as photo editing, layout design, and illustration, and other like categories of tasks and activities.

The authors and manufacturers of such software applications can employ various techniques by which to distinguish proper and valid copies of software applications from those that are invalid and made via unauthorized copying. One such technique comprises "activating" a software application via the entry of an identifier unique to each valid copy of a software application that enables the software application to perform additional tasks, provide additional functionality, or otherwise be changed or modified in an improved way. Such identifiers, as indicated above, will be referred to herein as "product keys" of the software application, and the entry of a valid product key can traditionally activate any copy of a software application of an appropriate type, including unlicensed copies. As such, while product keys do uniquely identify valid copies of software applications, they must be protected to avoid being used to activate otherwise invalid, and often illegal, copies of software applications.

Figure 2:
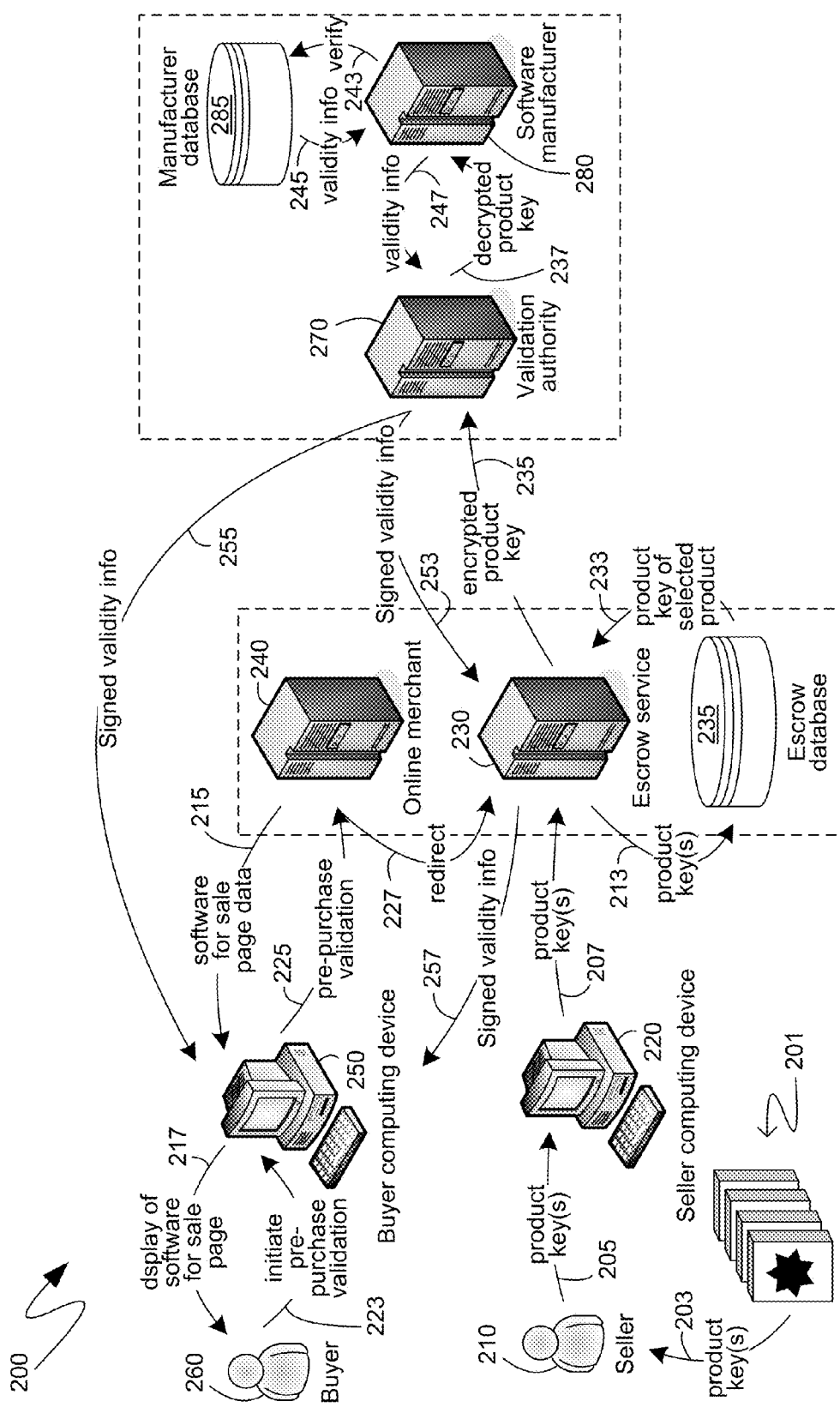
FIG. 2 is a system diagram illustrating an exemplary verification of software applications offered for sale through network-based mechanisms.

Turning to FIG. 2, the system 200 shown therein illustrates one exemplary system by which product keys of software applications being offered for sale can be protected from theft while simultaneously being utilized to verify the validity of such software applications, thereby benefiting both the buyer 260, in being able to identify valid copies of software applications prior to purchase, and the seller 210, in distinguishing themselves from unscrupulous or dishonest sellers. As shown in FIG. 2, and as will be described in more detail below, a validation authority 270 can receive asymmetrically encrypted product keys, decrypt them, and utilize the decrypted product keys to obtain information from the software manufacturer 280, or a delegate thereof, as to the validity of the copy of the software application associated with such product keys. The validation authority 270 can then sign such an indication of validity, to prevent tampering, and return it either to the buyer 260, or the seller 210, or a combination thereof.

The system 200 of FIG. 2 illustrates an exemplary system of verifying the validity of software applications being offered for sale through a networked environment. For example, the seller 210 of the system 200 of FIG. 2 can be selling the software applications 201 through a website accessible over the Internet, such that buyers of the software applications 201, such as the buyer 260, would typically not see, nor be able to inspect, the software applications until after they had already paid for them, and the software applications had been delivered, such as via courier services, or via electronic download. Therefore, in the system 200 of FIG. 2, as an initial step, the seller 210 can obtain the product keys from the software 201 that the seller is offering for sale, such as, for example, by reading the product keys from documentation included with, or associated with, the software 201, and can enter those product keys into the seller computing device 220 as indicated by communications 203 and 205. From the seller computing device 220, the product keys can be uploaded to an escrow service 230 as indicated by the communication 207. Upon receiving the product keys from the seller 210, such as via communication 207, the escrow service 230 can store the product keys in an escrow database 235 as illustrated by the communication 213.

In one embodiment, the escrow service 230 can be an entity independent of both the seller 210, the buyer 260, and any online merchant 240 through which the seller 210 may be attempting to sell the software 201. In another embodiment, the escrow service 230 may be offered by, or otherwise be in conjunction with, the online merchant 240. The dashed rectangle encircling both the escrow service 230 and the online merchant 240 shown in FIG. 2 is meant to illustrate such a possibility.

The online merchant 240 can comprise mechanisms by which the seller 210 can sell the software 201, including, for example, mechanisms for enabling sellers to list classified ads, mechanisms for enabling sellers to place items for auction, and mechanisms for enabling sellers to sell items through customized seller storefronts. In an alternative embodiment, the online merchant 240 can be nothing more than the network presence of the seller 210. One or more potential purchasers of the software 201, such as the buyer 260, can utilize computing devices, such as the buyer computing device 250, to establish network communications with the online merchant 240 and download therefrom information regarding the software being offered for sale. For example, as illustrated by the communication 215 shown in the system 200 of FIG. 2, the online merchant 240 can provide data regarding the software 201, to the buyer computing device 250, in the form of webpage data or other information appropriate for transmission over a network and display on a remote computing device. The information received from the online merchant 240 via communication 215 can be displayed by the buyer computing device 250 to the buyer 260 as illustrated by the communication 217.

Among the options that, in one embodiment, can be presented to the buyer 260, such as via the display on the buyer computing device 250, can be a selection mechanism by which the buyer can initiate a pre-purchase validation of the software 201 being offered for sale. If the buyer 260 were to select such option, such as indicated by the communication 223, network browsing mechanisms on the buyer computing device 250 could direct such a pre-purchase validation request to the online merchant 240, as indicated by the communication 225. The online merchant 240 can then redirect such a pre-purchase validation request 225 to the escrow service 230, as indicated by the redirection communication 227. As will be recognized by those of skill in the art, if the online merchant 240 and the escrow service 230 are part of the same entity, the redirection 227 can be nothing more then inter-process communications among processes that can even be executing on the same computing device.

Upon receipt of a pre-purchase validation request, such as that of communication 225 that was redirected to the escrow service 230 by the redirection 227, the escrow service can obtain one or more appropriate product keys from its escrow database 235, such as the product keys of the software 201 that were previously uploaded to the escrow service by the seller 210, and can asymmetrically encrypt those product keys. In one embodiment, not specifically illustrated in the system 200 of FIG. 2, the escrow service 230 can provide such asymmetrically encrypted product keys back to the buyer 260 to enable the buyer to independently contact the validation authority 270, and receive therefrom information regarding the validity of the software 201 being offered for sale, which the buyer is contemplating purchasing. In another embodiment, that is illustrated in the system 200 of FIG. 2, the escrow service 230 can directly provide the encrypted product keys to a validation authority 270, as illustrated by the communication 235.

As indicated previously, the validation authority 270 can be any trusted, independent third-party that can comprise sufficient information to decrypt the encrypted product keys, such as those received by the communication 235. In one embodiment, the asymmetric encryption of product keys, such as by the escrow service 230, can be done utilizing a public key of the validation authority 270. In such an embodiment, the validation authority 270 can then utilize its private key to decrypt such encrypted product keys and obtain the original product keys, which it can then utilize to verify the validity of the software applications associated with such product keys. Because the validation authority 270 can be an independent, trusted third party, the seller 210 need not be concerned that the validation authority 270 will steal the product keys and use them to activate otherwise invalid copies of the software 201. Similarly, because the product keys can be encrypted with the private key of the validation authority 270, only the validation authority, and not the buyer 260, will be able to decrypt them. Consequently, the seller 210 also need not be concerned that the buyer 260 will steal the product keys, since the buyer can only be provided with the encrypted product keys, which the buyer cannot decrypt because the buyer does not have access to the validation authority's private key.

Once the validation authority 270 receives the encrypted product keys, such as via communication 235 from the escrow service 230, the validation authority can decrypt the encrypted product keys and can provide the now unencrypted product keys to the software manufacturer 280, or a delegate thereof, for validation, as illustrated by the communication 237. In one embodiment, the validation authority 270 can be independent from the software manufacturer 280. In another embodiment, however, the validation authority 270 can be associated with the software manufacturer 280, including, for example, the software manufacturer 280 acting as a validation authority 270. The dashed rectangle, shown in FIG. 2, encircling both the validation authority 270 and the software manufacturer 280, is meant to illustrate such a possibility.

Upon receipt of product keys, such as those received from the validation authority 270 via communication 237, the software manufacturer 280 can reference a manufacturer database 285 to determine whether or not such product keys are valid. Thus, as shown in the system 200 of FIG. 2, the software manufacturer 280 can receive a communication 245, from the manufacturer database 285, indicating the validity of the product keys provided via communication 243. In one embodiment, the software manufacturer 280 can utilize existing mechanisms for activating software applications, such as the software applications 201, to determine whether received product keys are valid. In doing so, the software manufacturer 280 can change such existing mechanisms such that the validity information is returned without any change or modification to the software applications 201 themselves, including, for example, activating them if the product keys were valid, and deactivating them, or otherwise rendering them less functional, if the product keys were not valid.

The validity information obtained by the software manufacturer 280, via communication 245, can then be provided to the validation authority 270 via the communication 247. Upon receipt of such validity information, the validation authority 270 can sign such information and transmit it either back to the escrow service 230, such as via communication 253, or directly to the buyer computing device 250, such as via communication 255. Because the validity information can be signed by the validation authority 270, such as by being encrypted with the validation authority's private key, the recipient of such signed validity information can verify the validity information has not been tampered with, or otherwise modified. Consequently, even if the buyer computing device 250 were to receive the signed validity information from the escrow service 230, such as via communication 257, as opposed to receiving it directly from the validation authority 270, such as via communication 255, the buyer 260 could still verify that the validity information was not tampered with, and is, therefore, accurate.

In such a manner, the buyer 260 can perform a pre-purchase validation of the software 201 being offered for sale by the seller 210, thereby reducing the buyers risk in purchasing such software, while simultaneously not introducing any additional risk to the seller that the product keys of the software being offered for sale will be stolen by the buyer. In a further embodiment, should the buyer 260 decide to purchase the software on which the buyer initiated a pre-purchase validation, the escrow service 230 can be notified of such a purchase, such as by the seller 210, the online merchant 240, or even the buyer 260, and can remove, from the escrow database 235, the product keys of the software that was purchased, so that subsequent pre-purchase inspections can be based on product keys of software that is still properly available for sale and has not already been sold.

In many situations, a buyer, such as the buyer 260, may not necessarily buy the software applications 201 as independent standalone purchases. Instead, a buyer, such as the buyer 260, may obtain the software applications 201 because they are bundled with a computing device that the buyer 260 has purchased or the buyer 260 can, themselves, be a reseller of software and hardware bundles. However, simply because the software applications 201 are being offered for sale as a bundle with a computing device that is also being offered for sale does not mean that the buyer 260 may be any less concerned about the validity of such bundled software applications.

Figure 3:
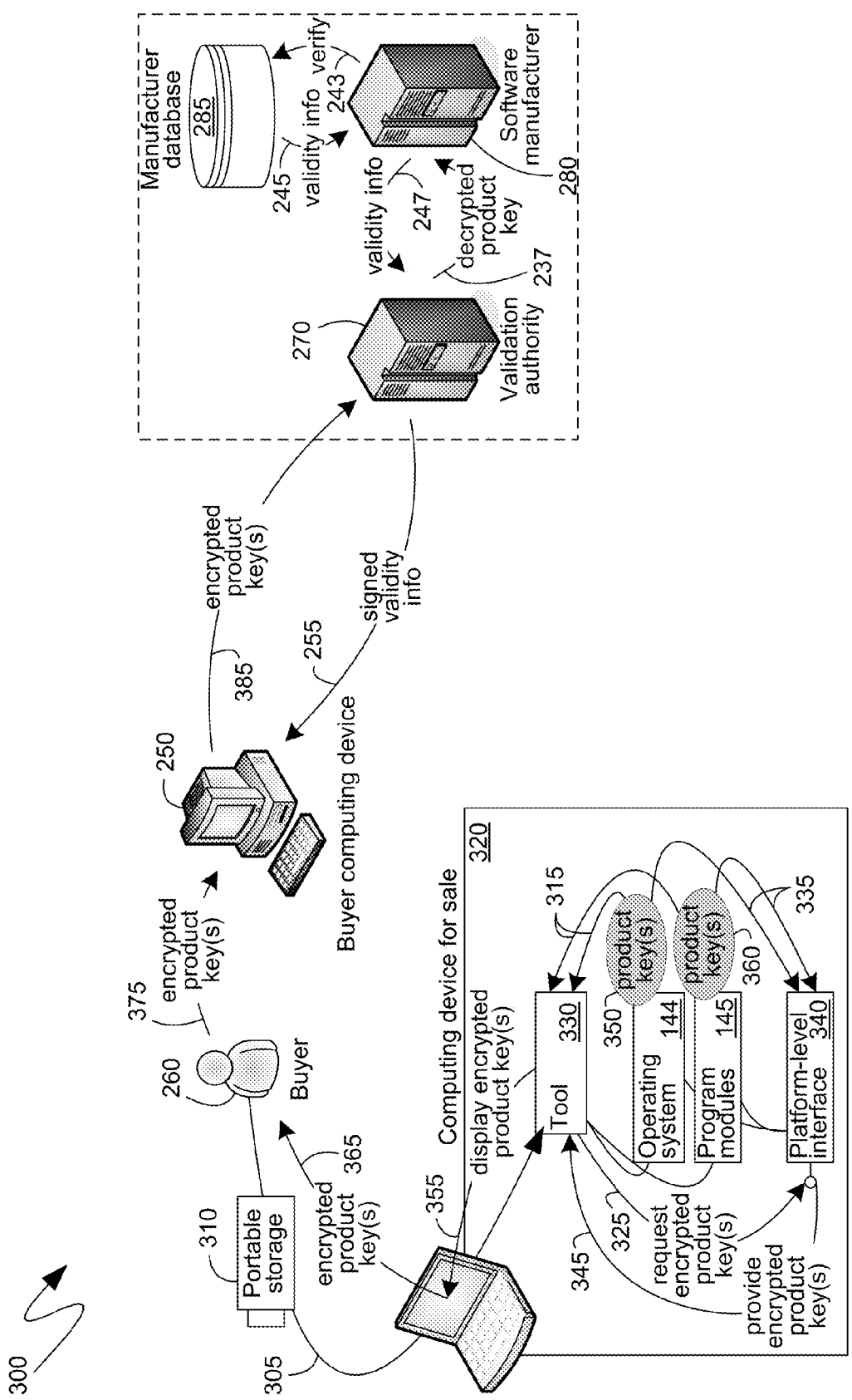
FIG. 3 is a system diagram illustrating an exemplary verification of software applications offered for sale within the context of a computing device offered for sale.

Consequently, and turning to FIG. 3, the system 300 shown therein illustrates an embodiment by which the validity of software applications, bundled with a computing device 320 that is being offered for sale, can be verified. In the case of software applications being bundled with a computing device 320 that is being offered for sale, the buyer 260 can often physically inspect the computing device 320. Therefore, in the embodiment shown in the system 300 of FIG. 3, the buyer 260 can bring with them a portable storage device 310 upon which can be encoded computer-executable instructions in the form of a tool 330 that can be downloaded to the computing device 320 when the buyer 260 communicationally couples the portable storage device 310 to the computing device 320 and copies thereto the tool 330, as illustrated by the communication 305.

Once executed on the computing device 320, the tool 330 can, in one embodiment, obtain the product keys of the various software application programs that can be installed on, and bundled with, the computing device 320. For example, if the computing device 320, like the exemplary computing device 100 of FIG. 1, comprises an operating system 144 and program modules 145, the tool 330 can obtain the product keys 350 and 360, of the operating system 144 and program modules 145, respectively, as illustrated by the communication 315. Subsequently, the tool 330 can encrypt the product keys 350 and 360, and can display the encrypted product keys on a display device communicationally coupled to the computing device 320, as illustrated by the communication 355.

The buyer 260 can then obtain the encrypted product keys, such as by reading them from the display device of the computing device 320, as illustrated by the communication 365, and can then enter, as illustrated by the communication 375, those encrypted product keys into a computing device that the buyer may already own, or otherwise have access to, such as the buyer computing device 250. The buyer 260 can then instruct the buyer computing device 250 to provide the encrypted product keys to the validation authority 270, such as illustrated by the communication 385. The validation authority 270 can then proceed to obtain validity information associated with such product keys from the software manufacturer 280, as described in detail above. As also described above, once the validation authority 270 has obtained the validity information from the software manufacturer 280, such as via communication 247, the validation authority can sign such validity information and can provide it to the buyer computing device 250, such as via communication 255. As before, the buyer 260 can then make an informed purchasing decision, with regards to the computing device 320, and the software applications bundled thereon, given the validity information received from the validation authority 270.

In an alternative embodiment, rather than trusting that the tool 330, provided by the buyer 260, will properly encrypt the product keys, such as product keys 350 and 360, of the software applications bundled with the computing device 320, the seller of the computing device can provision the computing device to enable a platform level interface 340 which can be utilized by the tool 330 to obtain already encrypted product keys, thereby protecting the unencrypted product keys from the tool. More specifically, as shown in FIG. 3, the tool 330 can utilize the platform level interface 340 and can request encrypted product keys from such an interface, as illustrated by the request 325. The platform level interface 340 can then obtain the product keys 350 and 360, such as, for example, in a similar manner to the tool 330 itself, and can then encrypt such product keys and provide the encrypted product keys to the tool 330, such as via response 345. The tool 330 can then proceed to display the encrypted product keys on a display device communicationally coupled to the computing device 320, as described above.

Figure 4:
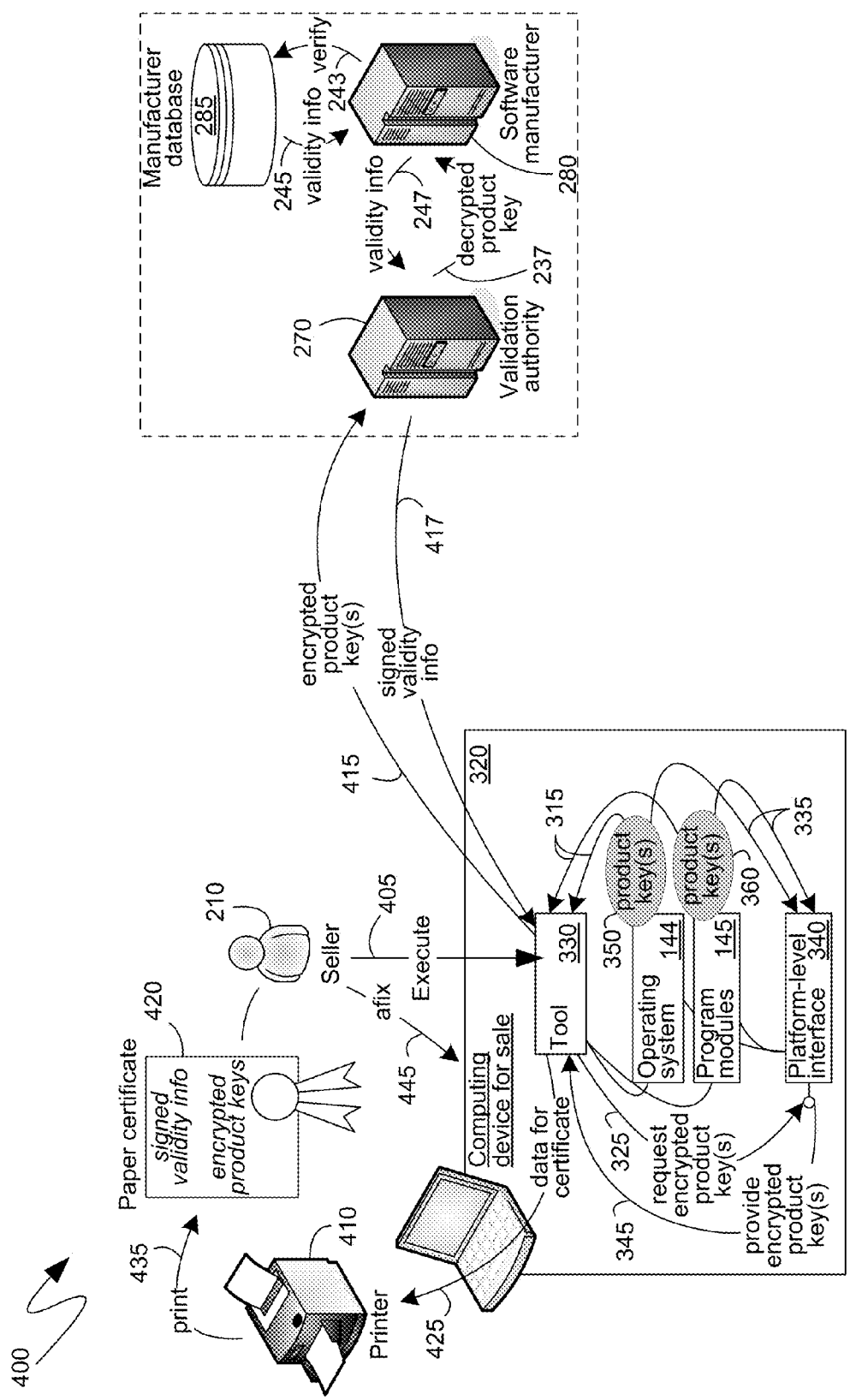
FIG. 4 is a system diagram illustrating another exemplary verification of software applications offered for sale within the context of a computing device offered for sale.

In an alternative embodiment, illustrated by the system 400 of FIG. 4, the seller 210, rather than the buyer 260, can execute the tool 330. More specifically, and turning to FIG. 4, as shown by the system 400 illustrated therein, the seller 210 can execute, via command 405, the tool 330. The tool 330 can then, as before, obtain encrypted product keys, including, for example, by obtaining the product keys, such as the product keys 350 and 360, directly and then encrypting them, or by utilizing the platform level interface 340 and receiving already encrypted product keys therefore, both as described in detail above.

In the embodiment illustrated in FIG. 4, however, the seller 210 can instruct the tool 330, not to display the encrypted product keys, but rather to communicate them to the validation authority 270, such as illustrated by the communication 415. As before, the validation authority 270 can reference the software manufacturer 280 and obtain therefrom validity information regarding the product keys provided via the communication 415, and can then sign such validity information and return it to the tool 330, such as is illustrated by the communication 417. The tool 330 can then generate a certificate, based on the validity information received via the communication 417 from the validation authority 270, and can, in one embodiment, provide the data of such a certificate to a printer 410 that is communicationally coupled to the computing device 320, as illustrated by the communication 425. In another embodiment, the tool can otherwise generate a physical or electronic certificate, including by electronically transmitting relevant information to third party certificate generation entities. The printer 410 can print a certificate 420, as illustrated by the printing action 435. In one embodiment, the printed certificate 420 can comprise both an indication of the validity information received from the validation authority 270, and an indication of the encrypted product keys, such as were obtained by the tool 330. Such a printed certificate can be attached, by the seller 210 to the computing device 320, as shown by the affixing action 445. The paper certificate 420 can be utilized as an advertisement by the seller 210 that the software applications bundled with the computing device 320 are valid, and can further be provided, by the seller, to potential buyers to enable those buyers to enter the encrypted product keys into their own computing devices and obtain verification of the validity of the bundled software applications themselves.

Figure 5:
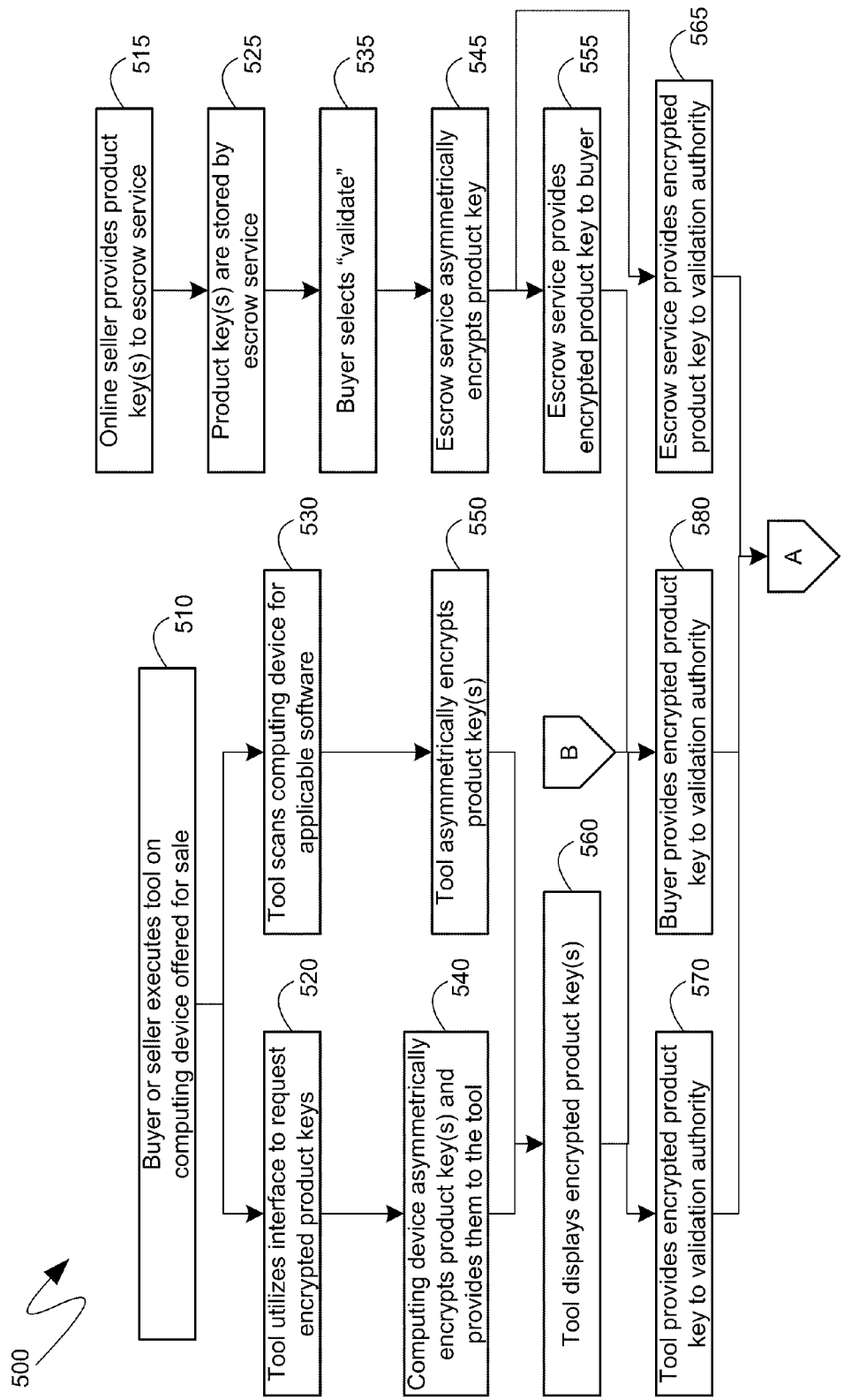
FIG. 5 is a flow diagram of an aspect of an exemplary verification of software applications being offered for sale.

Turning to FIG. 5, the flow diagram 500 shown illustrates an exemplary series of steps that can be performed to provide pre-purchase validity inspection of software applications that are offered for sale. As shown in the flow diagram 500 of FIG. 5, for software applications that are bundled with a computing device that is offered for sale, the buyer, or seller, can, at step 510, execute a tool on the computing device that is being offered for sale to obtain the encrypted versions of the product keys of the software applications that are bundled thereon.

The tool can either utilize an existing interface to request encrypted product keys, as indicated by step 520, or the tool can itself scan the computing device for applicable software, and obtain from such software its product keys, as indicated by alternative step 530. If the tool requested encrypted product keys from an existing interface at step 520, then the computing device can asymmetrically encrypt the product keys of the software applications bundled with the computing device and can provide them to the tool at step 540. Alternatively, if the tool scans the computing device itself at step 530, and does not utilize an existing interface, such as in step 520, then the tool can, at step 550, asymmetrically encrypt the product keys it obtained at step 530. The tool can then, optionally, display the encrypted product keys on a display device of the computing device with the bundled software applications at step 560.

If the software applications whose validity was to be checked prior to purchase were not bundled on a computing device that the buyer could inspect, but were instead offered for a sale that would be consummated via network communications, then the relevant steps could begin at step 515 when an online seller provides one or more product keys, of one or more software applications that such a seller seeks to sell, to an escrow service. Subsequently, at step 525, the product keys can be stored by the escrow service until, at step 535, a potential purchaser initiates a validation of a software application corresponding to one or more of the product keys. In such a case, the escrow service can asymmetrically encrypt the relevant product key, or product keys, at step 545, and can either provide the encrypted product key to the buyer, at step 555, or can provide it directly to the validation authority at step 565.

If the buyer receives the encrypted product keys, either from the escrow service at step 555, or from the display of the tool at step 560, the buyer can provide the encrypted product keys to the validation authority at step 580. As yet another alternative, the tool executed to obtain the encrypted product keys at either step 540 or at step 550 can provide such encrypted product keys directly to the validation authority at step 570. The relevant processing can then proceed with the flow diagram 600 of FIG. 6.

Figure 6:
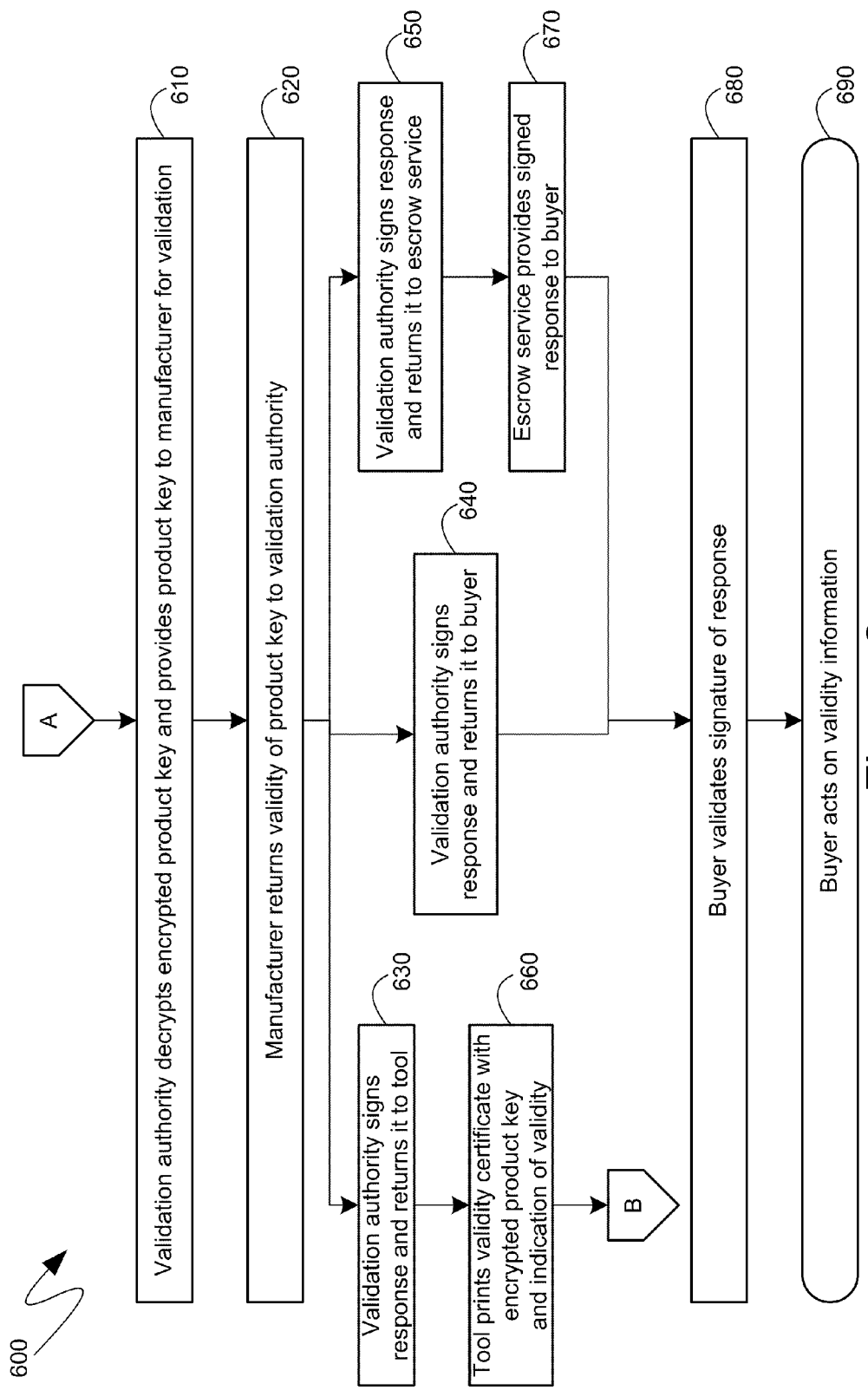
FIG. 6 is a flow diagram of another aspect of an exemplary verification of software applications being offered for sale.

Turning to FIG. 6, the flow diagram 600 illustrates an exemplary series of steps that can be performed after the steps of the flow diagram 500 of FIG. 5. More particularly, once a validation authority has received encrypted product keys, such as from a tool at step 570, from a potential purchaser at step 580, or from an escrow service at step 565, the validation authority can, at step 610, decrypt the encrypted product keys and provide them to a manufacturer of the software applications for validation. As indicated previously, in one embodiment, the product keys can be asymmetrically encrypted with a public key of the validation authority, such that the validation authority, with its private key, can be the only entity that should be able to decrypt such asymmetrically encrypted product keys.

At step 620, the manufacturer of the software applications associated with the product keys can return validity information regarding such product keys to the validation authority. The validation authority can then sign such validity information and return it to the potential purchaser at step 640 or, alternatively, to the escrow service at step 650 or, as yet another alternative, directly to the tool at step 630.

If the tool had received the signed indication of validity at step 630, then, optionally, the tool could generate and print a validity certificate with the encrypted product keys and the indication of validity at step 660. Such a validity certificate could then be obtained by the potential purchaser, and the potential purchaser could independently verify the indication of validity indicated on the certificate by providing the encrypted product keys from the certificate to the validation authority at step 580. Processing could then continue from step 580 as described.

Alternatively, if the validation authority had provided the signed validation information to the escrow service at step 650, then the escrow service could forward along such a signed response to the buyer at step 670. The potential purchaser can, at step 680, validate the signature of the validation authority with which the validity information was signed, whether such signed validity information was received directly from the validation authority at step 640, or through the escrow service at step 670. The buyer can then act on the validity information provided at step 690.

While not specifically illustrated in the systems and flow diagrams described above, additional embodiments contemplate various market targeted nuances that can be integrated into the above described mechanisms. For example, if the validity information returned indicates that the product keys are not valid, the buyer can be provided with an option of reporting the seller, such as to the online merchant 240, the validation authority 270, or the software manufacturer 280. Similarly, if the validity information returned indicates that the product keys are not valid, the seller can be provided with instructions on how to purchase valid copies of software applications, such as in a tax-free manner or otherwise appropriate for resale.

In another embodiment, the above described mechanisms can be utilized to check the validity of software applications that may have already been purchased, or may otherwise already be installed on existing computing devices. For example, the above described mechanisms can be utilized as part of a software asset management inspection, or to otherwise verify compliance with various corporate policies. For example, the product keys of existing, already installed, or already purchased, software applications can be provided to the validation authority 270 in a manner similar to that described above, invalidity information can be returned from the validation authority regarding such product keys. Alternatively, for the verification of validity of already purchased, or already installed, software applications, the product keys of such software applications can be provided directly to the software manufacturer 280 and use can be made of the interfaces and mechanisms provided by the software manufacturer 280, such as to the validation authority 270, to enable the obtaining of information regarding the validity of product keys without any attendant changes being directed to the software applications associated with such product keys. In such a manner, buyers, or software asset managers, can check the validity of already purchased software application copies without fear that those copies are going to be degraded, deactivated, or otherwise changed or reduced in capability. As an additional incentive, in situations where software application products that were already purchased are found to be invalid, the software manufacturer 280 may be willing to extend special pricing to such owners of invalid software application copies in an effort to gain revenue and legitimate customers.

As can be seen from the above descriptions, mechanisms for checking the validity of software applications without exposing unique identifying information to theft have been enumerated. In view of the many possible variations of the subject matter described herein, we claim as our invention all such embodiments as may come within the scope of the following claims and equivalents thereto.

We claim:

1. One or more computer-readable storage media comprising computer-executable instructions for performing a one-way product verification, the computer-executable instructions directed to steps comprising:
   identifying one or more software applications installed on a computing device;
   obtaining at least one product key associated with at least one of the one or more software applications, the at least one product key being protected from a user executing the computer-executable instructions;
   protecting the at least one product key from being revealed to the user by the computer-executable instructions; and
   providing an asymmetrically encrypted version of the at least one product key to a validation authority, the asymmetrically encrypted version of the at least one product key being asymmetrically encrypted in such a manner that it can only be decrypted by the validation authority.

2. The computer-readable storage media of claim 1, wherein the providing the asymmetrically encrypted version of the at least one product key to the validation authority comprises displaying the asymmetrically encrypted version of the at least one product key on a display device communicationally coupled to the computing device to enable a user of the computing device to provide the displayed asymmetrically encrypted version of the at least one product key to the validation authority.

3. The computer-readable storage media of claim 1, comprising further computer-executable instructions for: receiving validity information about the at least one of the one or more software applications from the validation authority, the received validity information having been signed by the validation authority; and verifying the signing of the validity information.

4. The computer-readable storage media of claim 3, comprising further computer-executable instructions for generating a printable certificate comprising the validity information and the asymmetrically encrypted version of the at least one product key, the printable certificate providing evidence of the validity information about the at least one of the one or more software applications installed on the computing device to potential purchasers of the computing device.

5. The computer-readable storage media of claim 1, wherein the computer-executable instructions for protecting the at least one product key from being revealed to the user comprise computer-executable instructions for asymmetrically encrypting the obtained at least one product key.

6. The computer-readable storage media of claim 1, wherein the obtaining at least one product key comprises: requesting, from a platform-level interface, an already asymmetrically encrypted product key associated with the at least one of the one or more software applications; and receiving, from the platform-level interface, the already asymmetrically encrypted product key; and wherein further the protecting the at least one product key from being revealed to the user is performed in conjunction with the platform-level interface.

7. The computer-readable media of claim 1, wherein the asymmetrically encrypted version of the at least one product key is asymmetrically encrypted with a public key of the validation authority such that it can only be decrypted by the private key of the validation authority.

8. One or more computer-readable storage media comprising computer-executable instructions for escrowing product keys of software applications being offered for sale and performing a one-way product verification thereon, the computer-executable instructions directed to steps comprising:
   receiving one or more product keys associated with one or more software applications being offered for sale through an online merchant;
   storing the one or more product keys in an escrow database;
   receiving a request to perform a pre-purchase validation of at least one software application from among the one or more software applications being offered for sale;
   selecting, from among the stored one or more product keys, at least one product key associated with the at least one software application;
   asymmetrically encrypting the selected at least one product key so that it can be decrypted by a validation authority; and
   providing the asymmetrically encrypted version of the at least one product key to the validation authority.

9. The computer-readable storage media of claim 8, wherein the providing the asymmetrically encrypted version of the at least one product key to the validation authority comprises transmitting the asymmetrically encrypted version of the at least one product key to a potential purchaser of the at least one software application who initiated the request to perform the pre-purchase validation.

10. The computer-readable storage media of claim 8, comprising further computer-executable instructions for: receiving validity information about the at least one of the one or more software applications from the validation authority, the received validity information having been signed by the validation authority.

11. The computer-readable storage media of claim 10, comprising further computer-executable instructions for: transmitting the signed validity information to the potential purchaser.

12. The computer-readable storage media of claim 8, comprising further computer-executable instructions for: receiving an indication that a software application, from among the one or more software applications, has been sold; and removing, from the escrow database one or more product keys associated with the sold software application.

13. A system for performing a one-way product verification of copies of software applications, the system comprising:
a software manufacturer that created the software applications, the software manufacturer comprising a first interface for receiving one or more product keys associated with specific copies of the software applications and providing, in return, validity information about the specific copies of the software applications; and
a validation authority comprising: a second interface for receiving asymmetrically encrypted product keys associated with the specific copies of the software applications and providing, in return, signed validity information about the specific copies of the software applications; and one or more computer-readable media comprising a first set of computer-executable instructions for performing a one-way product verification, the first set of computer-executable instructions directed to steps comprising: receiving the asymmetrically encrypted product keys; decrypting the asymmetrically encrypted product keys to obtain the one or more product keys associated with the specific copies of the software applications; providing, to the first interface of the software manufacturer, the one or more product keys; receiving, from the software manufacturer, the validity information about the specific copies of the software applications; signing the validity information; and transmitting the signed validity information.

14. The system of claim 13, further comprising portable computer-readable media comprising a second set of computer-executable instructions for performing a one-way product verification, the second set of computer-executable instructions directed to steps comprising: identifying one or more software applications, from among the software applications created by the software manufacturer, installed on a computing device; obtaining at least one product key associated with at least one of the one or more software applications; and providing an asymmetrically encrypted version of the at least one product key to the validation authority.

15. The system of claim 13, further comprising an escrow service, the escrow service comprising an escrow database and one or more computer-readable media comprising a third set of computer-executable instructions for escrowing product keys of software applications being offered for sale and performing a one-way product verification thereon, the third set of computer-executable instructions directed to steps comprising: receiving one or more product keys associated with one or more software applications, from among the software applications created by the software manufacturer, being offered for sale through an online merchant; storing the one or more product keys in the escrow database; receiving a request to perform a pre-purchase validation of at least one software application from among the one or more software applications being offered for sale; selecting, from among the stored one or more product keys, at least one product key associated with the at least one software application; asymmetrically encrypting the selected at least one product key; and
providing the asymmetrically encrypted version of the at least one product key to the validation authority.

16. The system of claim 13, wherein the validation authority further comprises a validation authority private key that is kept secret and a validation authority public key that is made publically available, and wherein further: the asymmetrically encrypted product keys are asymmetrically encrypted with the validation authority public key; the decrypting the asymmetrically encrypted product keys comprises utilizing the validation authority private key to decrypt the asymmetrically encrypted product keys; and the signing the validity information comprises utilizing the validation authority private key to sign the validity information.

17. The system of claim 13, wherein the received asymmetrically encrypted product keys are received from a potential purchaser of at least one copy of the software applications; and wherein further the transmitting the signed validity information is transmitted to the potential purchaser.

18. The system of claim 13, wherein the asymmetrically encrypted product keys received from the potential purchaser are received via an escrow service; and wherein further the transmitting the signed validity information to the potential purchaser comprises transmitting the signed validity information to the escrow service.

19. The system of claim 13, wherein the received asymmetrically encrypted product keys are received from a software asset manager; and wherein further the specific copies of the software applications have already been purchased by an entity associated with the software asset manager.

20. The system of claim 13, wherein the software manufacturer further comprises one or more computer-readable media comprising a fourth set of computer-executable instructions for extending specialized pricing on legitimate copies of the software applications, the fourth set of computer-executable instructions directed to steps comprising: identifying the specific copies of the software applications as being invalid; and providing, to an entity that has already purchased the specific copies of the software applications, the specialized pricing on legitimate copies of the software applications.

* * * * *